(12) United States Patent
Ahn et al.

(10) Patent No.: US 12,480,769 B2
(45) Date of Patent: Nov. 25, 2025

(54) METHOD FOR SEARCHING FOR SHORTEST PATH HAVING MINIMUM LINK BETWEEN BUILDINGS IN RECTILINEAR POLYGON OBSTACLE ENVIRONMENT

(71) Applicant: POSTECH ACADEMY-INDUSTRY FOUNDATION, Pohang-si (KR)

(72) Inventors: Hee Kap Ahn, Pohang-si (KR); Tae Kang Eom, Pohang-si (KR); Hwi Kim, Pohang-si (KR); Min Cheol Kim, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 147 days.

(21) Appl. No.: 18/318,663

(22) Filed: May 16, 2023

(65) Prior Publication Data

US 2023/0400308 A1 Dec. 14, 2023

Related U.S. Application Data

(60) Provisional application No. 63/356,005, filed on Jun. 27, 2022.

(30) Foreign Application Priority Data

Jun. 13, 2022 (KR) ........................ 10-2022-0071234

(51) Int. Cl.
*G01C 21/34* (2006.01)

(52) U.S. Cl.
CPC ............................. *G01C 21/3407* (2013.01)

(58) Field of Classification Search
CPC ............ G01C 21/3446; G01C 21/3415; G01C 21/20; G01C 21/3453; G01C 21/3867;
(Continued)

(56) References Cited

U.S. PATENT DOCUMENTS

2009/0040931 A1 * 2/2009 Bast ................... G01C 21/3446
370/238
2021/0158009 A1 * 5/2021 Zhou .................... G06V 20/176

FOREIGN PATENT DOCUMENTS

| CN | 110162041 A | * | 8/2019 | |
| CN | 113358129 A | * | 9/2021 | ......... G01C 21/3446 |
| KR | 2021-0008213 A | | 1/2021 | |

OTHER PUBLICATIONS

Office Action in Korean Application No. 10-2023-0044712, dated Jan. 16, 2024, 4 pages.
(Continued)

*Primary Examiner* — Khoi H Tran
*Assistant Examiner* — Alyse Tramanh Tran
(74) *Attorney, Agent, or Firm* — Morgan, Lewis & Bockius LLP

(57) ABSTRACT

The present disclosure relates to a method for searching for the shortest path having a minimum link between buildings in a rectilinear polygon obstacle environment, which has been implemented to calculate the shortest path having a minimum link, among the shortest paths based on a Manhattan distance from one building to another building, when buildings are given in a rectilinear polygon obstacle environment. According to the present disclosure, in searching for the shortest path having a minimum link between two buildings, a more efficient data structure can be used in terms of an execution time and memory. A building-building minimum link and shortest path search problem can be solved through only the addition of very small operations by using the segment-point minimum link and shortest path search algorithm which can be easily expanded to the building-building minimum link and shortest path search problem.

7 Claims, 5 Drawing Sheets
(5 of 5 Drawing Sheet(s) Filed in Color)

(58) Field of Classification Search
CPC .... G01C 21/34; G06Q 10/047; G05D 1/0217; G05D 1/0088; G05D 1/0274; G05D 1/0212; G06F 16/9024; G06F 16/909; G08G 1/096805; G08G 1/096833; G05B 19/4061; G06T 19/003; G06T 2210/12; G06T 7/11

See application file for complete search history.

(56) References Cited

OTHER PUBLICATIONS

F. Comellas et al., "The Multidimensional Manhattan Networks", Electronic Notes in Discrete Mathematics, (2007).

* cited by examiner

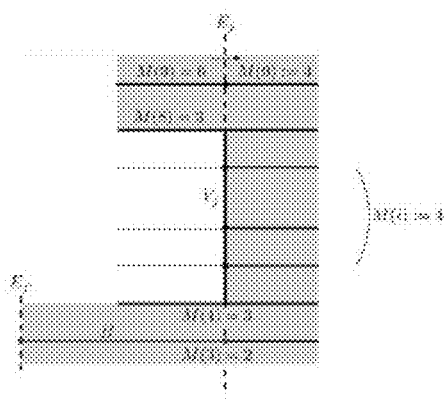 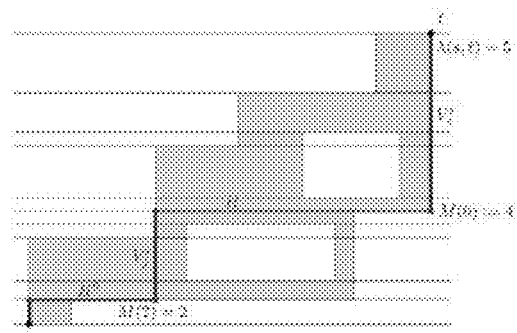
FIG. 7(a)   FIG. 7(b)
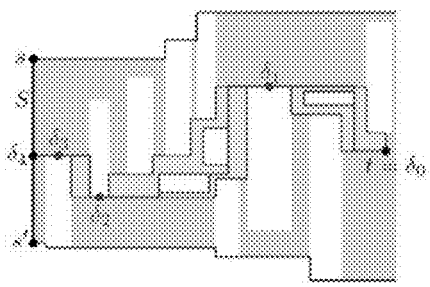
FIG. 8
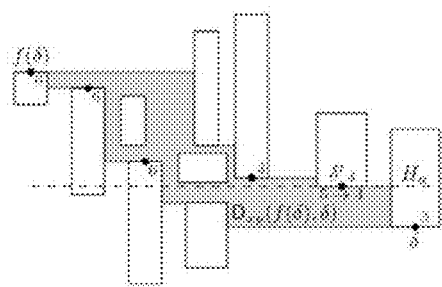 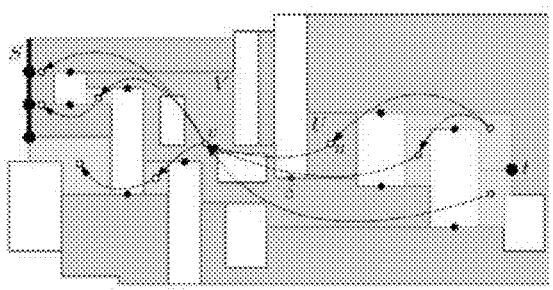
FIG. 9(a)   FIG. 9(b)

METHOD FOR SEARCHING FOR SHORTEST PATH HAVING MINIMUM LINK BETWEEN BUILDINGS IN RECTILINEAR POLYGON OBSTACLE ENVIRONMENT

CROSS-REFERENCE TO RELATED APPLICATIONS

This application claims the benefit of Korean Application No. 10-2022-0071234 filed on Jun. 13, 2022, and U.S. Provisional Application No. 63/356,005, filed on Jun. 27, 2022, the entirety of each of which is incorporated herein by reference for all purposes.

BACKGROUND

1. Technical Field

The present disclosure relates to a method for searching for the shortest path having a minimum link, and more particularly, to a method for searching for the shortest path having a minimum link between buildings in a rectilinear polygon obstacle environment, which has been implemented to calculate the shortest path having a minimum link, among the shortest paths based on a Manhattan distance from building to another building, when buildings are given in a rectilinear polygon obstacle environment.

The present disclosure was carried out through the support of two national projects.

The first project was as follows. A unique project number: 1711193606, a detailed project number: 2017-0-00905-007, a ministry name: The Ministry of Science and ICT, a specialized research management agency: Information and Communication Planning and Evaluation Institute, a research project name: Development of Source Technology in SW Computing Industry (R&D, informatization), a research project name: (SW StarLab) an optimal data structure and application algorithm in a dynamic geometry environment, a contribution ratio: 50%, a supervision institution: Pohang University of Science and Technology Industry-Academic Cooperation Foundation, and a research period: Jan. 1, 2023 to Dec. 31, 2023.

The second project was as follows. A unique project number: 1711193975, detailed project number: 2019-0-01906-005, a ministry name: The Ministry of Science and ICT, a specialized research management agency: Information and Communication Planning and Evaluation Institute, a research project name: Information and Communication Broadcasting Innovation Resource Cultivation, a research project name: Support for AI Graduate School (Pohang University of Science and Technology), a contribution ratio: 50%, a supervision institution: Pohang University of Technology Industry-Academic Cooperation Foundation, and a research period: Jan. 1, 2023 to Dec. 31, 2023.

2. Related Art

The present disclosure relates to search for a Manhattan shortest path in a rectilinear polygon obstacle environment. The present disclosure may be used to calculate an optimal path (e.g., a distance, a time, or a cost) between a given starting point and a given destination point, and may be used in various fields, such as a navigation system and an autonomous moving robot. In this case, the rectilinear polygon environment means that all obstacles are composed of only segments in a vertical or horizontal direction. A Manhattan distance between two points on a plane means the shortest distance when an object can move only in the vertical or horizontal direction.

In general, the inside of a city is constant in the direction of a road, and thus may be approximated as a rectilinear polygon environment. Accordingly, it is reasonable to use the Manhattan distance as a distance between two points. Accordingly, many techniques for calculating the shortest path between a starting point and a destination point in a rectilinear polygon environment by using the Manhattan distance have been known.

The shortest path search algorithm in the rectilinear polygon environment is an algorithm for searching for a path having the shortest Manhattan distance among paths that connect a given starting point and a given destination point. For example, a navigation system provides the shortest path from a current location to a destination when the destination is set at the current location. If a path up to the destination is turned in the navigation system, it is reasonable to also take into consideration a link, meaning the number of times that the path has been turned, because the time is consumed for the turn.

A conventional shortest distance query algorithm merely calculates the shortest path and returns an arbitrary path without taking into consideration other factors when the number of shortest paths is multiple. Accordingly, if the number of links is many in a path calculated by the algorithm, more time may be taken compared to another shortest path because a cost for a turn for each link is consumed. As a result, the conventional shortest path search algorithm may not efficiently operate in the navigation system.

In most of the shortest path search algorithms that have been known so far, a link is not taken into consideration. Although a link is taken into consideration, only a minimum link and shortest path between given two points is calculated. However, an algorithm for calculating a minimum link and shortest path from a building to a building, which is a more common situation, has not been known so far.

SUMMARY

The present disclosure has been made to solve the problem, and an object of the present disclosure is to provide a method of searching for the shortest path having a minimum link between two buildings so that the time taken to move up to a destination is minimized in a rectilinear polygon obstacle environment.

In an embodiment, a method of searching for the shortest path having a minimum link between two buildings in a rectilinear polygon obstacle environment may include, in searching for the shortest path, solving a segment-point minimum link and shortest path search problem in a rectilinear quadrangle environment, expanding the segment-point minimum link and shortest path search problem to a segment-segment minimum link and shortest path search problem, expanding the rectilinear quadrangle environment to a rectilinear polygon environment, and expanding the segment-segment minimum link and shortest path search problem to a building-building minimum link and shortest path search problem.

The solving of the segment-point minimum link and shortest path search problem may include dividing the rectilinear quadrangle environment into eight areas based on a starting segment, finding an area to which a point corresponds, among the eight areas and solving the segment-point minimum link and shortest path search problem by using a sweep line algorithm from the starting segment to the point.

The expanding of the segment-point minimum link and shortest path search problem to the segment-segment minimum link and shortest path search problem may include dividing an arrival segment based on an area including the arrival segment, and applying, to each segment, an algorithm that is used in the solving of the segment-point minimum link and shortest path search problem.

The expanding of the rectilinear quadrangle environment to the rectilinear polygon environment may include substituting each obstacle in the rectilinear polygon environment with a rectilinear convex hull of the obstacle, and applying an algorithm that is used in the solving of the segment-point minimum link and shortest path search problem in the rectilinear quadrangle environment.

The expanding of the segment-segment minimum link and shortest path search problem to the building-building minimum link and shortest path search problem may include constructing a data structure in which a distance from each location of each building to a quadrangle is able to be calculated by considering rectilinear quadrangles that surround the building, and applying, to each segment, an algorithm that is used in the expanding of the segment-segment minimum link and shortest path search problem.

According to the method of searching for the shortest path having a minimum link between two buildings in a rectilinear polygon obstacle environment according to the present disclosure, in terms of an execution time and memory, a more efficient data structure can be used and the shortest distance between two buildings can be calculated compared to a conventional technology.

Furthermore, the present disclosure may be used to calculate an optimal path by taking into consideration a distance, a time, and a cost between a given starting point and a given destination point, and may be applied to various fields, such as a navigation system and an autonomous moving robot.

The present disclosure has an advantage in that it can solve a building-building minimum link and shortest path search problem through only the addition of very small operations by using the segment-point minimum link and shortest path search algorithm which can be easily expanded to the building-building minimum link and shortest path search problem.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 7(a) and 7(b) illustrate a method of adding a canonical segment in an xy-monotone area.

FIG. 8 illustrates a method of splitting the shortest path in an x-monotone area into xy-monotone shortest paths.

FIG. 9(a) illustrates a method of calculating a minimum link and shortest path within an xy-monotone area that is included within an x-monotone area, and FIG. 9(b) illustrates a method of making the x-monotone area along which the shortest path passes a directed acyclic graph (DAG) in the xy-monotone areas.

DETAILED DESCRIPTION

The present disclosure relates to a method of calculating a path having a minimum link, among the shortest paths on the basis of a Manhattan distance from one building to another building when buildings are given in a rectilinear polygon environment. Hereinafter, the contents of the present disclosure are described more specifically with reference to the drawings and codes.

Figure 1:
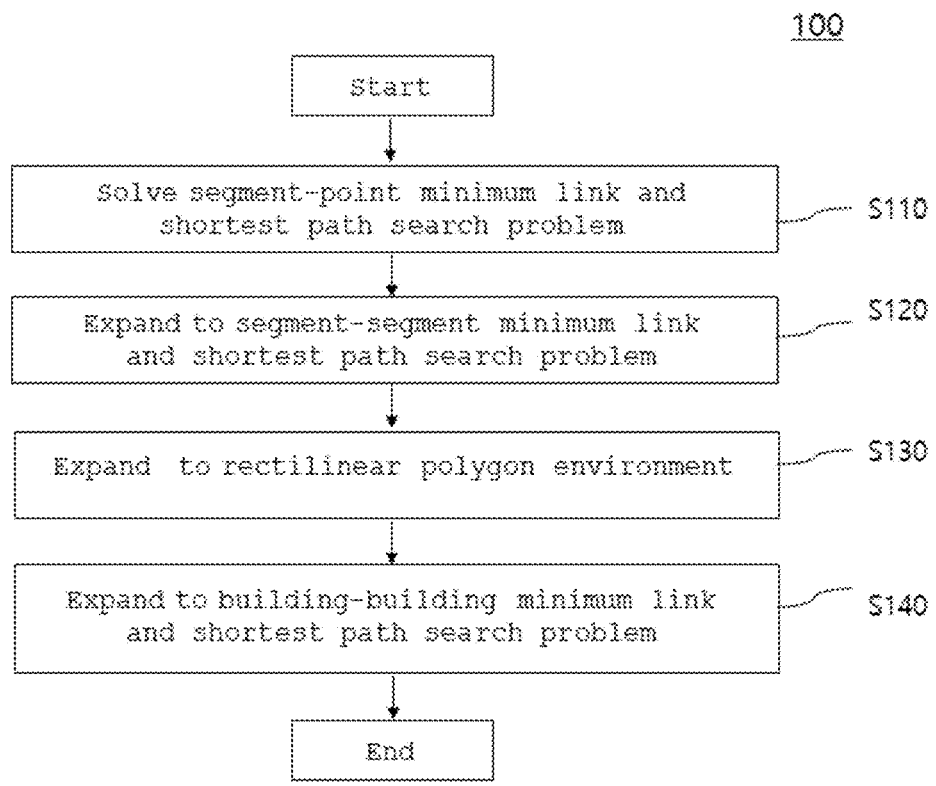
FIG. 1 is a flowchart for describing a process of a method of searching for a minimum link and shortest path between buildings in a rectilinear polygon obstacle environment according to the present disclosure.

FIG. 1 is a flowchart for describing a process of a method of searching for a minimum link and shortest path between buildings in a rectilinear polygon obstacle environment according to the present disclosure.

Referring to FIG. 1, a method 100 of searching for a minimum link and shortest path between buildings in a rectilinear polygon obstacle environment according to the present disclosure includes a step S110 of solving a segment-point minimum link and shortest path search problem, a step S120 of extending to a segment-segment minimum link and shortest path search problem, a step S130 of extending to a rectilinear polygon environment, and a step S140 of extending to a building-building minimum link and shortest path search problem.

In the step S110 of solving the segment-point minimum link and shortest path search problem, a minimum link and shortest path search problem between one segment and one point in a rectilinear quadrangle obstacle environment is solved.

In the step S120 of extending to the segment-segment minimum link and shortest path search problem, a segment-point minimum link and shortest path search problem is expanded to the segment-segment minimum link and shortest path search problem.

In the step S130 of extending to the rectilinear polygon environment, the rectilinear quadrangle obstacle environment is expanded to the rectilinear polygon obstacle environment.

In the step S140 of extending to the building-building minimum link and shortest path search problem, the segment-segment minimum link and shortest path search problem is expanded to the building-building minimum link and shortest path search problem.

As described above, in the present disclosure, in order to solve the building-building minimum link and shortest path search problem in the rectilinear polygon environment, first, a shortest path search problem between one segment and one point in the rectilinear quadrangle obstacle environment is solved. The building-building minimum link and shortest path search problem is solved by expanding the shortest path search problem step by step.

Figure 2:
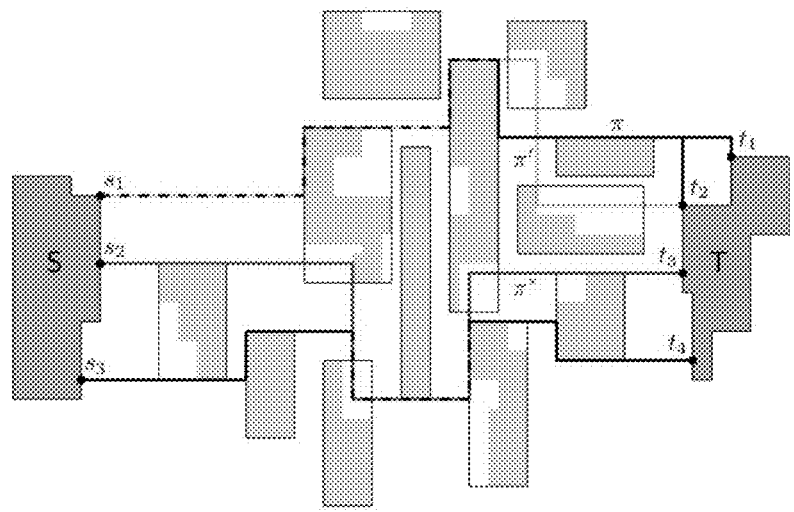
FIG. 2 is a diagram for describing a state in which a building-building shortest path problem is solved by using the shortest path algorithm which is proposed by the present disclosure.

FIG. 2 is a diagram for describing a state in which a building-building shortest path problem is solved by using the shortest path algorithm which is proposed by the present disclosure.

FIG. 2 illustrates a rectilinear area separated into boxes having S and T, respectively. A bright gray rectilinear polygon is an obstacle. FIG. 2 illustrates six pairs of points (s1, t1), (s1, t2), (s2, t3), (s2, t4), (s3, t3), and (s3, t4) that determine the length of the shortest path from S to T.

For example, a path (n) from the point s1 to t1 (or t2) is a minimum link and shortest path having eight links, among all of the shortest paths that do not intersect the inside of the obstacle box from S to T. However, a blue path (n') from the point s1 to the point t2 has seven links. A red path (n*) from the point s2 to the point t3 has five links.

In the step S110 of solving the segment-point minimum link and shortest path search problem, when the rectilinear polygon obstacle environment O is given, the shortest path search problem having a minimum link from a segment S to a point t may be solved by using Code 1 as follows.
<Code 1>

---

Algorithm seg2pt MLSP rectangles xy (S, t, O)

---

Input: a rectilinear segment S, a point t within, $D_{xy}^1$, a rectilinear quadrangle obstacle environment O
Output: a minimum link and shortest path from the segment S to the point t within the rectilinear quadrangle obstacle environment O
1: define straight lines obtained by expanding horizontal segments $V_1, ..., V_z$, O in order of increasing x-coordinates of vertical segments of O included in $D_{xy}^1$ as $H_1, ..., H_m$ in order of increasing y-coordinates
2: $T_{ran}$ is an empty binary tree
3: C ← ∅      ▷ a set of canonical segments
4: for from j = 1 to z
5:   if j = 1 then    ▷ Originate
6:     M(α(j)) ← 1, M(i) ← 2 with respect to all i ∈ [α(j) + 1, β(j)]
7:     $T_{ran}$.insert ([α(1), β(1)])
8:   else if [a', α(j)], [β(j), b'] is present within $T_{ran}$ then Merge
9:     k* ← arg min$_{k \in [a',α(j)] \cup [β(j),b']}$ M(k)
10:    M(i) ← min$_{k \in [a',α(j)]}$ M(k) + 2 with respect to all i ∈ [α(j) + 1, β(j) − 1]
11:    M(i) ← min {M(i), min$_{k \in [a',α(j)]}$ M(k) + 2} with respect to all i ∈ [β(j), b']
12:    $T_{ran}$.delete ([a', α(j)]), $T_{ran}$.delete ([β(j), b'])
13:    $T_{ran}$.insert ([a', b'])
14:  else if [a', α(j)] ∈ $T_{ran}$ then     ▷ Attach
15:    k ← arg min$_{k \in [a',α(j)]}$ M(k)
16:    M(i) ← arg min$_{k \in [a',α(j)]}$ M(k) + 2 with respect to all i ∈ [α(j) + 1, β(j)]
17:    $T_{ran}$.delete ([a', α(j)])
18:    $T_{ran}$.insert ([a', β(j)])
19:  else if [α(j), b'] is present within $T_{ran}$ then
     ▷ Detach
20:    k ← arg min$_{k \in [α(j),b']}$ M (k)
21:    M(i) ← min{M(i), min$_{k \in [α(j),β(j)−1]}$ M(k) + 2} with respect to all i ∈ [β(j), b']
22:    $T_{ran}$.delete ([α(j), b'])
23:    $T_{ran}$.insert ([β(j), b'])
24:  else if [a', b'], that is, [α(j), β(j)] ⊂ [a', b'], is present within $T_{ran}$ then
     ▷ Split
25:    k ← arg min$_{k \in [α(j),b']}$ M (k)
26:    M(i) ← min {M(i), min$_{k \in [α(j),β(j)−1]}$ M(k) + 2} with

---

Algorithm seg2pt MLSP rectangles xy (S, t, O)

--- respect to all i ∈ [β(j), b']
27:    $T_{ran}$.delete ([[a', b']])
28:    $T_{ran}$.insert ([a', α(j)]]), $T_{ran}$.insert ([[β(j), b'])
29:  else if j = z then     ▷ Terminate
30:    k* ← arg min$_{k \in [α(j),β(j)]}$ M(k)
31:    λ(S, t) ← min {M(m), min$_{k \in [α(j),β(j)−1]}$ M(k) + 1 }
32:  end if
33:  if j ≠ 1 then
34:    define a segment c, that is, $x_1(c) = x(V_j)$, $x_2(c) = x(V_j)$, y(c) = y($H_{k*}$)
35:    ▷ j' is an event updated from a value of M(k*)
36:    C.insert(c)
37:  end if
38: end for
39: Π ← t     ▷ a minimum link and shortest path starting from t
40: p ← t     ▷ an end point path of Π
41: while x(p) ≠ x(s)
42:   find a canonical segment c, that is, x(p) = x2(c), in C
43:   connect s and a vertical segment that connects c to Π
44:   p ← a left point of s
45: end while
46: return Π

---

Prior to a description of the algorithm, it is assumed that S is a vertical direction segment and x coordinates of t is greater than x coordinates of S. Even in the remaining cases, a minimum link and shortest path may be calculated by applying a similar algorithm.

Figure 3:
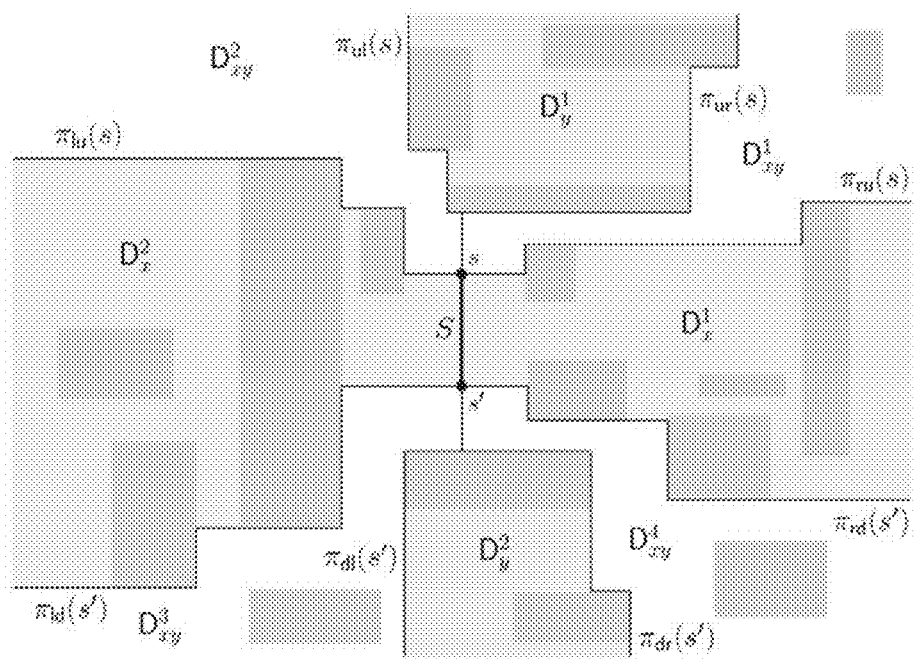
FIG. 3 is a diagram illustrating a state in which the rectilinear polygon environment has been divided into eight areas based on characteristics (x-monotone, y-monotone, and xy-monotone) of the shortest path from a segment to a point in the rectilinear polygon environment.

FIG. 3 is a diagram illustrating a state in which a rectilinear polygon environment has been divided into eight areas based on characteristics (x-monotone, y-monotone, and xy-monotone) of the shortest path from a segment to a point in the rectilinear polygon environment.

As illustrated in FIG. 3, first, an obstacle environment O is divided into eight areas on the basis of a segment S. When a rectangle area D and the vertical segment S are given, the rectangle area D may be split into a maximum of eight separated areas by using eight xy-monotone paths at the end point of the segment S. In this case, points in the same area have the same properties (x-monotone, y-monotone, and xy-monotone) of the shortest path from the segment S to a corresponding point.

All of the shortest paths from the segment S to one point of the area are the x-monotone, the y-monotone, and the xy-monotone. Furthermore, there are a baseline set and a minimum link and shortest path from the segment including a segment included in the baseline to the point t depending on the area to which the point t belongs. An algorithm may use a plane sweep technique having a sweep line that moves from the segment S to the point t based on the baseline set and minimum link and shortest path, and can efficiently calculate the number of minimum links at the intersection of the baseline and the sweep line.

Accordingly, after an algorithm when the point t is located at an xy-monotone area is described, an algorithm when the point t is located at an x-monotone area will be described. When the point t is located at a y-monotone area, a minimum link and shortest path may be calculated by using an algorithm that is almost similar to the algorithm when the point t is located at the x-monotone area.

Figure 4A:
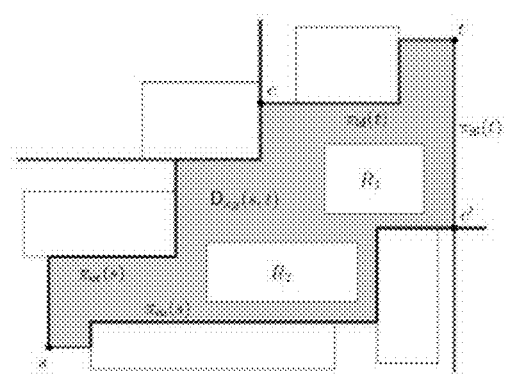
FIG. 4(a) illustrates an xy-monotone area in which a starting point and an end point are s and t, respectively.
Figure 4B:
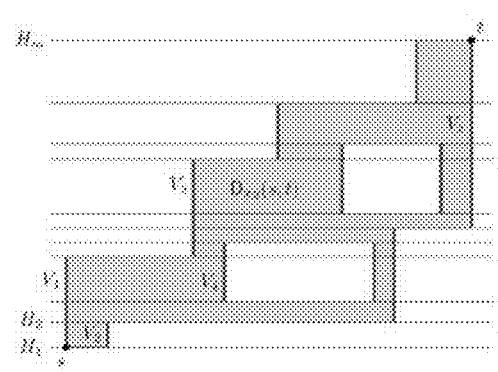
FIG. 4(b) is a diagram illustrating vertical segments and horizontal segments within the xy-monotone area.

FIG. 4(a) illustrates the xy-monotone area in which a starting point and an end point are s and t, respectively, and FIG. 4(b) is a diagram illustrating vertical segments and horizontal segments within the xy-monotone area.

First, a case in which t belongs to the xy-monotone area is described. It is assumed that t is located in the area $D_{xy}^1$ in FIG. 2. A path from an upper point, among two end points of the segment S, to t is the shortest path, and a progress direction thereof is upward or the right. Accordingly, an area through which the shortest path may pass is an area indicated in gray in FIGS. 4(a) and 4(b).

Vertical segments of a rectangle included in the colored area are called $V_1, \ldots, V_z$ in order of x coordinates thereof. Baselines, that is, straight lines extending from horizontal segments, are called $H_1, \ldots, H_m$ in order of y-coordinates thereof. $c_i$ is defined as an intersection point of $H_1$ and L. M(i) means the number of links of a minimum link and shortest path from s to $c_i$.

The present algorithm updates M(i) whenever L passes through $V_j$ as L moves from s to t while increasing its x coordinates. At the moment when L reaches t, the present algorithm calculates a minimum link from s to t, and calculates the shortest path having the minimum link. As described above, the algorithm for updating a data structure in which L moves from a starting point in order of coordinates is called a sweep line algorithm. L at a current location is called a sweep line.

Only paths up to $c_i$ are considered because horizontal segments in a minimum link and shortest path are always located on baselines. In order to maintain the intersection of L and the xy-monotone area while the algorithm is executed, vertical segments that form the intersection are stored in the balanced binary tree $T_{ran}$. In this case, the locations of the vertical segments are represented as the indices of the horizontal segments. A case in which the sweep line passes through $V_j$ may be divided into six types as in FIGS. 5(a)-5(f).

FIGS. 5(a)-5(f) illustrate six events which occur in the algorithm for calculating a minimum link and shortest path.

Figures 5A, 5B, 5C, 5D, 5E, 5F:
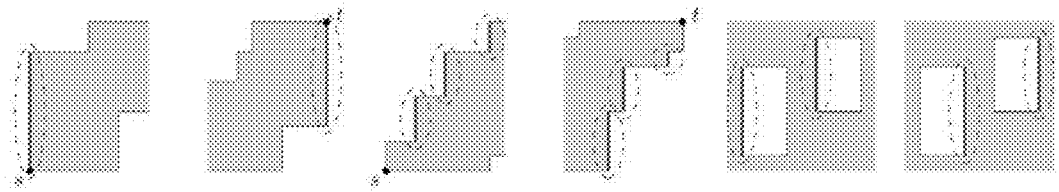
FIGS. 5(a)-5(f) illustrate six events which occur in an algorithm for calculating a minimum link and shortest path.

FIG. 5(a) is an originate event including s, that is, the starting point. FIG. 5(b) is a terminate event including the destination point t. FIG. 5(c) is an attach event in which $V_j$ extends one of segments that have been previously stored in $T_{ran}$. FIG. 5(d) is a detach event in which $V_j$ reduces one of the segments that have been previously stored in $T_{ran}$. FIG. 5(e) is a split event in which $V_j$ is divided into two segments by removing $V_j$ from one of the segments that have been previously stored in $T_{ran}$. FIG. 5(f) is a merge event in which two of the segments that have been previously stored in $T_{ran}$ are merged into one by $V_j$.

In each event, reference is made to Code 1 for the update of M(i). A minimum value in an area unit may be calculated and updated through O(logn) operations by using a segment tree.

Figure 6:
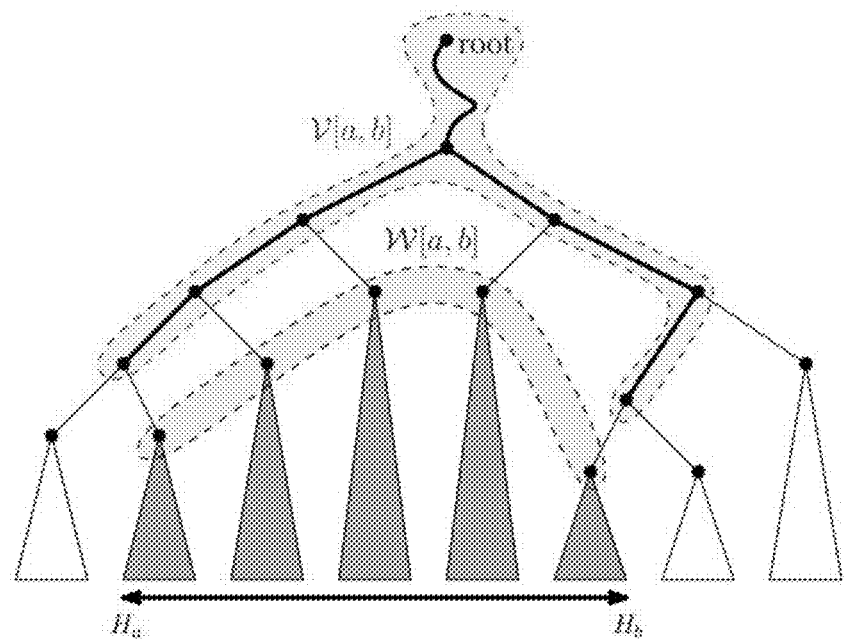
FIG. 6 illustrates a diagram of a shape of a data structure, which is constructed for a fast operation of a geographic information search algorithm which is proposed by the present disclosure.

FIG. 6 illustrates a diagram of a shape of a data structure, which is constructed for a fast operation of a geographic information search algorithm which is proposed by the present disclosure.

In FIG. 6, V[a,b] indicates nodes that are necessary to calculate $\min_{k \in [a,b]} M(k)$. W[a,b] indicates nodes that are necessary to update all M(i), that is, $i_\epsilon[a,b]$, and is always indicated as O(logn) in number.

FIGS. 7(a) and 7(b) illustrate a method of adding a canonical segment in the xy-monotone area.

The canonical segment is used in order to find the shortest path having a minimum link, after L reaches t and the minimum link from s to t is calculated. Referring to FIG. 7(b), a minimum link and shortest path from s to t includes three vertical segments (blue) and two horizontal segments (red). The horizontal segment (red) is the canonical segment in the xy-monotone area.

The canonical segment is calculated every event except the originate event by using the following method. Referring to FIG. 7(a), in an event corresponding to $V_j$, an index $k^+$ having the smallest M(i) before M(i) s are updated is calculated. For example, when $V_j$ is the merge event, $k^* = \min_{k \in [a',\alpha(j)] \cup [\beta(j), b']} M(k)$. Next, a canonical segment on $H_k^*$ having $c_i$ as a right point is added. A left point in the canonical segment is located in $V_j$ that has been most recently updated from M(k*).

FIG. 8 illustrates a method of splitting the shortest path in the x-monotone area into xy-monotone shortest paths.

When t belongs to the x-monotone area, the shortest distance from S to t is first calculated by using Code 2, and a minimum link and shortest path is then calculated.

<Code 2>

| Algorithm seg2pt MLSP rectangles x dist (S, t, O) |
| --- |
| Input: a rectilinear segment S, a point t within $D_x^1$, a rectilinear quadrangle obstacle environment O |
| Output: calculate d(S, δ(R)), d(S, δ'(R)) with respect to rectangles R between S and t, among rectangles of $D_x^1$ |
| 1: align all the rectangles in O which are included in $D_x^1$ in order of x-coordinate values of δ(R) |
| 2: for with respect to all the rectangles R, that is, x(δ(R)) < x(t), within $D_x^1$ |
| 3:     for δ = δ(R), δ'(R) |
| 4:         calculate a point $p_δ$ that first collides against O or $D_x^1$ by horizontally drawing a straight line from δ to the left side |
| 5:     if when $p_δ$ is a point on S then |
| 6:         d(S, δ) ← $\lvert \overline{p_δ δ} \rvert$ |
| 7:     else if $p_δ$ is located at the boundary of $D_x^1$ then |
| 8:         d(S, δ) ← d(S, $p_δ$) + $\lvert \overline{p_δ δ} \rvert$ |
| 9 :     else if pδ is a point on a rectangle R' then |
| 10:        d(S, δ) ← min{d(S, δ (R')) + d(δ (R'), $p_δ$), d(S, δ'(R')) + d (δ'(R'), $p_δ$)} + $\lvert \overline{p_δ δ} \rvert$ |
| 11:     end if |
| 12:   end for |
| 13: end for |
| 14:calculate a point $p_t$ that first collides against S or $D_x^1$ by horizontally drawing a straight line from t to the left side |
| 15: if when $p_t$ is a point on S then |
| 16:    d(S, t) ← $\lvert \overline{p_t t} \rvert$ |
| 17: else if when $p_t$ is located at the boundary of $D_x^1$ then |
| 18:    d(S, δ) ← d(S, $p_δ$) + $\lvert \overline{p_δ δ} \rvert$ |
| 19: else if when $p_t$ is located on the rectangle R' then |
| 20:    d(S, t) ← min {d(S, δ(R')) +d(δ(R'), $p_t$), d(S, t) ← d(S, δ'(R')) +d(δ'(R'), $p_t$)}+$\lvert \overline{p_t t} \rvert$ |
| 21: end if |

In order to calculate the shortest distance from S to t, the shortest distance from S to a corresponding point is calculated whenever a middle point of a horizontal segment of the rectangle is reached while increasing x coordinates from S to t. With respect to the rectangle R in the x-monotone area, δ(R) and δ'(R) indicate a middle point of an upper horizontal segment and a middle point of a lower horizontal segment in R, respectively. In this case, a distance up to the middle point of a corresponding horizontal segment may be calculated from a distance from a distance that has been stored in horizontal segments of the rectangle, which have been touched by drawing a straight line from the corresponding horizontal segment to the left. When the sweep line reaches t, the shortest distance between S and t is calculated by using distances that have been stored in a rectangle that is touched by horizontally drawing a straight line from t to the left.

The algorithm for calculating a minimum link and shortest path is based on the fact that the x-monotone shortest path always includes several xy-monotone shortest paths. From FIG. 8, it may be seen that a path is split on the basis of $δ_1, δ_2, δ_3$.

Figure 10A:
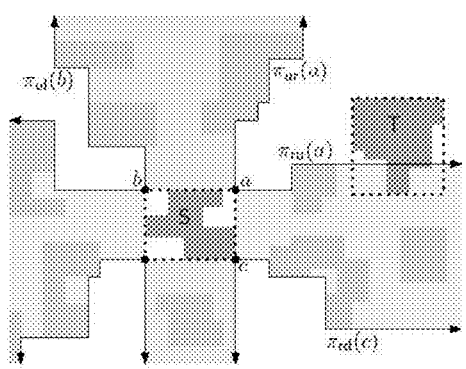
FIG. 10(a) illustrates a state in which rectilinear polygon environment is divided into eight areas based on characteristics (x-monotone, y-monotone, and xy-monotone) of the shortest path up to a point in a rectilinear polygon environment on the basis of a rectilinear polygon S.
Figure 10B:
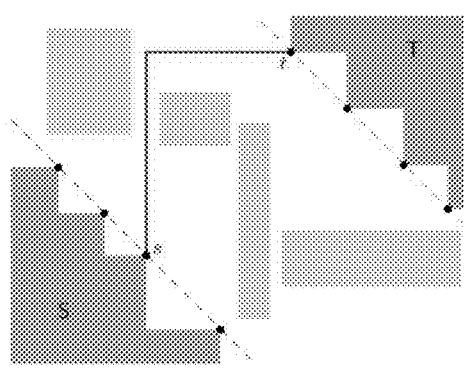
FIG. 10(b) illustrates a method of calculating both a starting point and a destination point in an xy-monotone shortest path.

FIG. 10(a) illustrates a method of calculating a minimum link and shortest path in the xy-monotone area included in the x-monotone area. FIG. 10(b) illustrates a method of making the x-monotone area through which the shortest path passes a directed acyclic graph (DAG) of the xy-monotone areas.

As illustrated in FIG. 9(b), the algorithm for calculating a minimum link and shortest path generates the DAG that connects the xy-monotone areas after dividing the x-monotone area through which the shortest path passes into the xy-monotone areas as in Code 3.

<Code 3>

---
Algorithm seg2pt MLSP rectangles x construct (S, t, O)
---

Input: a rectilinear segment S, a point t within $D_x^1$, a rectilinear quadrangle obstacle environment O, the results of d(S, δ(R)), d(S, δ'(R)) for rectangles R between S and t among rectangles within $D_x^1$.
Output: DAG G in which an area through which the shortest paths from S to t pass is divided into the xy-monotone areas and the areas are connected
1: calculate a point $p_t$ that first collides against O or $D_x^1$ by horizontally drawing a straight line from t to the left
2: if d(S, δ(R')) + d(δ(R'), $p_t$) ≤ d(S, δ'(R')) + d($p_δ^1$(R'), $p_t$) then
3:     prev(δ(R')) ← t
4: end if
5: if d(S, δ(R')) + d(δ(R'), $p_t$) ≥ d(S, δ'(R')) + d(δ'(R')), $p_t$) then
6:     prev(δ'(R')) ← t
7: end if
8: align all of the rectangles of O included in $D_x^1$ in order opposite to the order of x-coordinate values of δ(R)
9: for with respect to rectangles R between S and t among the rectangles within $D_x^1$
10:    if when prev(δ(R)) is present then
11:        calculate a point $p_δ$ that first collides against S or $D_x^1$ by horizontally drawing a straight line from δ(R) to the left
12:        if when $p_δ$ is located on S then
13:            insert(G, $D_{xy}$(prev(δ(R)), δ(R)))
14:            insert(G, $D_{xy}$(δ(R)), $p_δ$)
15:        else if when $p_δ$ is located at the boundary of $D_x^1$ then
16:            insert(G, $D_{xy}$(prev(δ(R)), δ(R)))
17:            insert(G, $D_{xy}$(δ(R), s)) (s is an upper point in S)
18:        else if when $p_δ$ is on a rectangle R' then
19:            if d(S, δ(R)) = d(S, δ(R')) + d(δ(R'), δ(R)) then
20:                if prev(R') = None or x(prev(R')) > x(prev(R)) then
21:                    prev(R') ← prev(R)
22:                end if
23:            end if
24:            if d(S, δ(R)) = d(S, δ'(R')) + d(δ'(R'), δ (R)) then
25:                prev(R') ← prev(R)
26:            end if
27:            if d(S, δ(R)) < d(S, δ(R')) + d(δ(R'), δ(R)) then
28:                insert(G, $D_{xy}$(prev(δ(R)), δ(R)))
29:            end if
30:        end if
31:    end if
32:    if when prev(δ'(R)) is present then
33:        an algorithm is omitted due to up and down symmetry with a case in which prev(δ(R)) is present
34:    end if
35: end for In Code 3, an area through which the shortest path may pass is found and simultaneously the area is divided into the xy-monotone areas while comparing values of d(s,δ(R))+d (δ(R),$P_R$) and d(s,δ'(R))+d(δ'(R),$P_R$) whenever a straight line collides against a rectangle R by drawing the straight line from t to the left. The DAG is updated by using Code 4 at the moment when the xy-monotone area is generated.

<Code 4>

---
Algorithm insert (G, (δ, δ'))
---

Input: DAG G, node $D_{xy}$($δ_1$, $δ_2$) to be added to G
Output: add $D_{xy}$($δ_1$, $δ_2$) to G and connect a main line subsequent to the added node ---
Algorithm insert (G, (δ, δ'))
---

1: add $D_{xy}$(δ, δ') to G
2: for with respect to all $D_{xy}$(δ', δ'')s in which δ' is located on $∂_{xy}$($δ_2$, $δ_1$)
    ------------→
3:     add $D_{xy}$(δ', δ'') $D_{xy}$($δ_1$, $δ_2$) to G
4: end for
5: for with respect to all $D_{xy}$(δ', δ'')s in which δ'' is located on ∂xy($δ_1$, $δ_2$)
    ------------→
6:     add $D_{xy}$($δ_1$, $δ_2$) $D_{xy}$(δ', δ'') to G
7: end for After the DAG is completed, the alignment of phases is performed in the corresponding graph, and an algorithm similar to the algorithm of Code 1 is then applied in order in each of the aligned xy-monotone areas. When the algorithm of Code 1 is performed in $D_{xy}$($δ_1$, $δ_2$), M(i) is updated in a portion at which an xy-monotone area connected to a main line that enters $D_{xy}$($δ_1$, $δ_2$) is terminated and is initialized by using a value of M(i) that has been updated so far in a portion in which the xy-monotone area connected to a main line that exits from $D_{xy}$($δ_1$, $δ_2$) is started (refer to FIG. 8). When t belongs to the x-monotone area, a process of calculating a minimum link and shortest path from S to t may be listed as in Code 5.

<Code 5>

---
Algorithm seg2pt MLSP rectangles x (S, t, O)
---

Input: a rectilinear segment S, a point t within $D_x^1$, a rectilinear quadrangle obstacle environment O
Output: a minimum link and shortest path from S to t within O
1: perform seg2pt MLSP rectangles_x_dist(S, t, R)
2: G ← seg2pt MLSP_rectangles_x_construct(S, t, R)
3: perform the alignment of phases on G
4: for with respect to each node $D_{xy}$($δ_1$, $δ_2$) of G
    ------------→
5:     update the number of links of main lines $D_{xy}$(δ', δ'') $D_{xy}$($δ_1$, $δ_2$) of G and then perform seg2pt_MLSP_rectangles_xy($δ_1$, $δ_2$)
6: end for In the step S120 of extending to the segment-segment minimum link and shortest path search problem, the above algorithm may be expanded to an algorithm for calculating a minimum link and shortest path from the segment S to a segment T as follows by using Code 6.

<Code 6>

---
Algorithm seg2seg MLSP rectangles (S, T, O)
---

Input: rectilinear segments S and T, a rectilinear quadrangle obstacle environment O
Output: a minimum link and shortest path from S to T within O
1: O is split into eight areas based on characteristics (x-monotone, y-monotone, and xy-monotone) of the shortest path from S to each point within O. Among them, T may be present in a maximum of five areas (e.g., one x-monotone area, two y-monotone areas, and two xy-monotone areas when T is a vertical segment)
2: When T is a vertical segment, a minimum link and shortest path may be calculated by performing Code 5 and Code 1 on end points t of each of partial segments of T that belongs to the y-monotone area and the xy-monotone area. Even when T is a horizontal segment, a minimum link and shortest path may be calculated by using a similar method -continued Algorithm seg2seg MLSP rectangles (S, T, O)

3: any point t on a partial segment T' of T belonging to the x-monotone area is selected and seg2pt_MLSP_rectangles_x_dist(S, t, O) is performed on the partial segment T'
4: with respect to a rectangle R belonging to the x-monotone area between S and T, a horizontal segment is drawn from δ(R), δ'(R) to the direction of T'. When the horizontal segment collides against a point t' of T', d(S, t') is calculated by using stored d(S, δ(R)), d(s, δ'(R))
5: The DAG G of the xy-monotone areas is calculated by using an algorithm similar to the algorithm of Code 3 by calculating t's having the smallest value among d(S, t')s. In this case, Lines 1 to 6 in Code 3 are repeated on all t's that have been obtained in the upper lines
6: A minimum link and shortest path is obtained from S to T by performing Lines 3 to 6 in Code 5 by using the DAG G that has been obtained in the upper line If the obstacle environment O is divided into eight areas on the basis of the segment S by using the method of FIG. 3, the segment T enters a maximum of five areas. Assuming that both S and T are vertical segments, a minimum link and shortest path with the segment S at end points of a partial segment has only to be calculated with respect to the partial segment of the segment T belonging to the y-monotone area and the xy-monotone area. With respect to a partial segment T' of T that belongs to the x-monotone area, a distance from the segments S to δ(R), δ'(R) is calculated with respect to all the rectangles R in the x-monotone area when the algorithm of Code 1 is performed.

A segment that reaches T' in the shortest path always meets a horizontal segment of any rectangle. Accordingly, a distance from S to T' may be calculated by calculating an intersection point between T' and a straight line that is drawn from δ(R), δ'(R) to the right with respect to all the rectangles R. A minimum link and shortest path is obtained by having only to add, as events, all points of T' corresponding to a destination point of the shortest path, not adding only one point as the first event in the minimum link and shortest path algorithm at one point.

In the step S130 of extending to the rectilinear polygon environment, the algorithm for calculating a minimum link and shortest path between two segments in the rectilinear quadrangle obstacle environment may be expanded to an algorithm for calculating a minimum link and shortest path between two segments in the rectilinear polygon environment as follows by using Code 7.
<Code 7>

Algorithm seg2seg MLSP (S, T, O)

Input: rectilinear segments S and T, a box-disjoint rectilinear polygon obstacle environment O
  Assumption: the rectilinear segments S and T are box-disjointed to O
  Output: a minimum link and shortest path from S to T within O
1: define a rectilinear polygon obstacle environment O' that is obtained by substituting each element of O with its own rectilinear convex hull
2: split the rectilinear polygon obstacle environment O' into eight areas based on the characteristics of the shortest path in S by using a method similar to the method in Line 1 of Code 6, and calculate a minimum link and shortest path in S by using a method similar to the method in Lines 2 to 6 of Code 6 with respect to each partial T' of T included in the split area. A difference lies in that all of vertical segments of the rectilinear polygon -continued Algorithm seg2seg MLSP (S, T, O)

obstacle environment O' are treated as events and δ(R) and δ'(R) are defined as middle points at the highest place and the lowest place, among the horizontal segments of each R, respectively, with respect to the rectilinear polygon R In this case, t is assumed that the two segments do not overlap any rectilinear quadrangle. It is considered that a plane is divided into the smallest rectilinear quadrangles that surround each obstacle of the rectilinear polygon environment O and any portion that is not included in any rectilinear quadrangle. An arbitrary minimum link and shortest path between S and T in the rectilinear polygon environment O' obtained by substituting each obstacle of the rectilinear polygon environment O with its own rectilinear convex hull is a minimum link and shortest path between S and T in the rectilinear polygon environment O. Accordingly, after the rectilinear polygon environment O is substituted with the rectilinear polygon environment O', a minimum link and shortest path between S and T in the rectilinear polygon environment O may be calculated by applying an algorithm almost similar to the algorithm for calculating a minimum link and shortest path between two elements in the rectilinear quadrangle obstacle environment. A difference in the rectilinear quadrangle obstacle environment is that all segments of the rectilinear polygon environment O', corresponding to an event, are added and δ(R) and δ'(R) are defined as middle points of the highest horizontal segment and the lowest horizontal segment with respect to the rectilinear polygon R.

Finally, in the step S140 of extending to the building-building minimum link and shortest path search problem, the algorithm for calculating a minimum link and shortest path between two segments in the rectilinear polygon environment may be expanded to an algorithm for calculating a minimum link and shortest path from a rectilinear polygon S to a rectilinear polygon T in the rectilinear polygon environment as follows by using Code 8.
<Code 8>

Algorithm pol2pol MLSP (S, T, O)

Input: rectilinear simple polygons S and T, a box-disjointed rectilinear polygon obstacle environment O, rectilinear segments S and T box-disjointed to O
  Assumption: the rectilinear simple polygons S and T, the box-disjointed rectilinear polygon obstacle environments O, the rectilinear segments S and T box-disjointed to O
  Output: a minimum link and shortest path from S to T within O
1: define a rectilinear polygon obstacle environment O' that is obtained by substituting each element of O with its own rectilinear convex hull, and generate a data structure for efficiently calculating $\min_{s' \in S} d(s, s')$, $\min_{t' \in T} d(t, t')$ by drawing an $L_1$-Voronoi diagram within B(S) and B(T)
2: split O' into eight areas based on the characteristics of the shortest path in S by using a method similar to the method in Line 1 of Code 6
3: calculate all points on the rectilinear simple polygons S and T, which are available as starting and end points of the shortest path with respect to the partial T' of the rectilinear simple polygon T included in the xy-monotone area, include all of the available starting points on S in the originate event, and include all of the available end points on T in the terminate event while applying Code 1
4: calculate a minimum link and shortest path for the partial T' of the rectilinear simple polygon T included in the x-monotone area by using an algorithm similar to the algorithm of Code 7, but draw a straight line in B(S) and

| Algorithm pol2pol MLSP (S, T, O) |
|---|
| B(T') instead of S and T' when horizontally drawing a straight line in δ(R) and δ'(R) in the rectilinear polygon R |
| 5: calculate a minimum link and shortest path by using the same method as that in Line 4 with respect to a partial T' of T included in the y-monotone area |

FIG. 10(a) illustrates a state in which a rectilinear polygon environment has been divided into eight areas based on the characteristics (x-monotone, y-monotone, and xy-monotone) of the shortest path up to a point within the rectilinear polygon environment on the basis of the rectilinear polygon S. FIG. 10(b) illustrates a method of calculating all of starting points and destination points of an xy-monotone shortest path.

As illustrated in FIG. 10(a), the rectilinear polygon environment may be divided into eight areas on the basis of the rectilinear polygon S. T may be placed in a maximum of five areas. It is considered that the five areas may be divided into a portion in the xy-monotone area and an area in the x-monotone area or the y-monotone area. It is first assumed that T' is a portion in the xy-monotone area, among the area occupied by T. In this case, minimum link and shortest path between S and T' may be calculated by using an algorithm similar to the algorithm of Code 1.

In this case, as illustrated in FIG. 10(b), the number of starting points and destination points of the shortest path may be several. As in FIG. 10(b), after all of starting points and destination points of the shortest path are calculated by drawing a tangent having a slope of 45 degrees in S and T, all of vertical segments that are included in the corresponding points have only to be added to the originate event and the terminate event in Code 1.

Assuming that a portion included in the x-monotone area in the area of T is T'', a minimum link and shortest path from S to T'' may also be similarly calculated by using Code 7.

It is assumed that a rectilinear quadrangle that surrounds S is B(S) and a rectilinear quadrangle that surrounds T is B(T). If a straight line is drawn from δ(R) and δ'(R) to the left, when the straight line meets B(S), a data structure in which the shortest distance from S with respect to each point of B(S) and the shortest distance from T with respect to each point of B(T) can be calculated in O(logn) through the Li Voronoi diagram is generated. d(S,δ(R)) and d(S,δ'(R)) are calculated based on the data structure.

After all of combinations of the starting points and destination points of the shortest path are calculated, a minimum link path has only to be calculated by using an algorithm similar to the algorithm of Code 8, but adding all of vertical segments of T including the destination points as events. An almost similar algorithm may be applied to a portion located in the y-monotone area in the area of T.

The present disclosure may be modified in various ways and may have various embodiments. Specific embodiments are to be illustrated in the drawings and specifically described in the detailed description. However, it should be understood that the present disclosure is not intended to be limited to specific embodiments, but include all of modifications, equivalents and/or substitutions included in the technical spirit and technical scope of the present disclosure.

All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

What is claimed is:

1. A computer-implemented method of determining a shortest path having a minimum link between two buildings in a rectilinear polygon obstacle environment, the method comprising:
   determining a segment-point minimum link and shortest path between a starting segment and a point using a first algorithm in a rectilinear quadrangle environment;
   computing a segment-segment minimum link and shortest path between the starting segment and an arrival segment based on the first algorithm;
   transforming the rectilinear quadrangle environment to a rectilinear polygon environment; and
   generating a building-building minimum link and shortest path based on the computing of the segment-segment minimum link and shortest path,
   wherein:
   the segment-point minimum link and shortest path is formed by a sequence of connected vertical segments and horizontal segments, wherein the vertical and horizontal segments alternate in orientation between vertical and horizontal, and the segment-segment minimum link and shortest path extends from the starting segment to the point;
   a binary tree data structure stores link count updates as a sweep line passes through vertical segments;
   the rectilinear polygon environment is divided into areas based on characteristics of a shortest path between the starting segment and a given point in the rectilinear polygon environment;
   the characteristics comprise at least two different types based on x-monotone, y-monotone, and xy-monotone characteristics;
   the areas comprise at least two different types of monotone areas based on an x-monotone area, a y-monotone area, and an xy-monotone area; and
   different points within the x-monotone area have the same x-monotone characteristics, different points within the y-monotone area have the same y-monotone characteristics, and different points within the xy-monotone area have the same xy-monotone characteristics.

2. The method of claim 1, wherein the determining of the segment-point minimum link and shortest path comprises:
   dividing the rectilinear quadrangle environment into eight areas based on the starting segment;
   finding an area to which a specified point corresponds, among the eight areas; and
   determining the segment-point minimum link and shortest path using a sweep line algorithm from the starting segment to the specified point.

3. The method of claim 1, wherein the the computing of the segment-segment minimum link and shortest path comprises:
   dividing the arrival segment based on a particular area comprising the arrival segment; and
   applying, to each point of the arrival segment, an algorithm that is used in the determining of the segment-point minimum link and shortest path.

4. The method of claim 1, wherein the transforming of the rectilinear quadrangle environment to the rectilinear polygon environment comprises:

substituting each obstacle in the rectilinear polygon environment with a rectilinear convex hull of the obstacle; and applying an algorithm that is used in the computing of the segment-segment minimum link and shortest path in the rectilinear quadrangle environment.

5. The method of claim 1, wherein the generating of the building-building minimum link and shortest path comprises:

constructing a data structure in which a distance from each location of each building to a quadrangle is calculated by considering rectilinear quadrangles that surround the building; and applying, to each segment, an algorithm that is used in the computing of the segment-segment minimum link and shortest path.

6. The method of claim 1, wherein:

the characteristics comprise the x-monotone, y-monotone, and xy-monotone characteristics; and the areas comprise the x-monotone area, the y-monotone area, and the xy-monotone area.

7. The method of claim 1, wherein:

a particular x-monotone area through which a particular shortest path passes is divided into xy-monotone areas, a directed acyclic graph is generated connecting the divided xy-monotone areas; and the computing of the segment-segment minimum link and shortest path is executed based on the directed acyclic graph.

* * * * *